(12) United States Patent
Hishida et al.

(10) Patent No.: US 8,598,300 B2
(45) Date of Patent: Dec. 3, 2013

(54) AMORPHOUS POLYESTER RESIN, BINDER RESIN FOR TONER FOR ELECTROSTATIC IMAGE DEVELOPMENT AND AMORPHOUS POLYESTER RESIN PRODUCTION METHOD

(75) Inventors: Tatsuhiro Hishida, Fukui (JP); Koji Ogawa, Fukui (JP); Yasumichi Moriyama, Fukui (JP); Masaaki Hosoda, Fukui (JP); Kazuo Tanabe, Fukui (JP)

(73) Assignee: Nicca Chemical Co., Ltd., Fukui-Shi, Fukui (JP)

( * ) Notice: Subject to any disclaimer, the term of this patent is extended or adjusted under 35 U.S.C. 154(b) by 0 days.

(21) Appl. No.: 13/641,829

(22) PCT Filed: Apr. 23, 2010

(86) PCT No.: PCT/JP2010/057282
§ 371 (c)(1),
(2), (4) Date: Nov. 2, 2012

(87) PCT Pub. No.: WO2011/132319
PCT Pub. Date: Oct. 27, 2011

(65) Prior Publication Data
US 2013/0041125 A1 Feb. 14, 2013

(51) Int. Cl.
*C08G 64/00* (2006.01)
*C08G 63/02* (2006.01)

(52) U.S. Cl.
USPC ........... 528/193; 528/176; 528/190; 528/192; 528/194

(58) Field of Classification Search
USPC .................... 528/176, 190, 192, 193, 194
See application file for complete search history.

(56) References Cited

U.S. PATENT DOCUMENTS

| 4,137,278 A | 1/1979 | Lemper et al. |
| 2001/0018157 A1 | 8/2001 | Aoki et al. |
| 2006/0292476 A1 | 12/2006 | Maehata et al. |

FOREIGN PATENT DOCUMENTS

| EP | 1 126 324 A1 | 8/2001 |
| JP | 05-017562 | 1/1993 |
| JP | 11-249339 | 9/1999 |
| JP | 2001-222138 | 8/2001 |
| JP | 2004-191623 | 7/2004 |
| JP | 2007-004033 | 1/2007 |
| JP | 2007-292946 | 11/2007 |
| JP | 2007-292946 A | 11/2007 |
| JP | 2008-534715 A | 8/2008 |
| WO | WO 2006/104821 A1 | 10/2006 |

OTHER PUBLICATIONS

Translation of the International Preliminary Report on Patentability, Application No. PCT/JP2010/057282, dated Nov. 6, 2012.
International Search Report, Application No. PCT/JP2010/057282, mailed Jun. 8, 2010.
European Search Report, Application No. 10850260.0 dated Aug. 20, 2013.

*Primary Examiner* — Terressa Boykin
(74) *Attorney, Agent, or Firm* — Leydig, Voit & Mayer Ltd.

(57) ABSTRACT

The invention provides an amorphous polyester resin that can sufficiently achieve the reciprocal performance properties of hot offset resistance and cold offset resistance, which is a major issue for a toner for electrostatic image development, while allowing adequate blocking resistance to be obtained, as well as a binder resin for toner for electrostatic image development, and an amorphous polyester resin production method, the amorphous polyester resin being obtained by reaction between a polybasic carboxylic acid compound and a polyhydric alcohol, wherein the polybasic carboxylic acid compound comprises (a) the reaction product between an aromatic polybasic carboxylic acid compound and a C2-4 glycol at 60 mol % or greater based on the total amount of the polybasic carboxylic acid compound, and the amorphous polyester resin has a glass transition point of 55° C. to 75° C. and a weight-average molecular weight of 10,000 to 50,000.

15 Claims, 1 Drawing Sheet

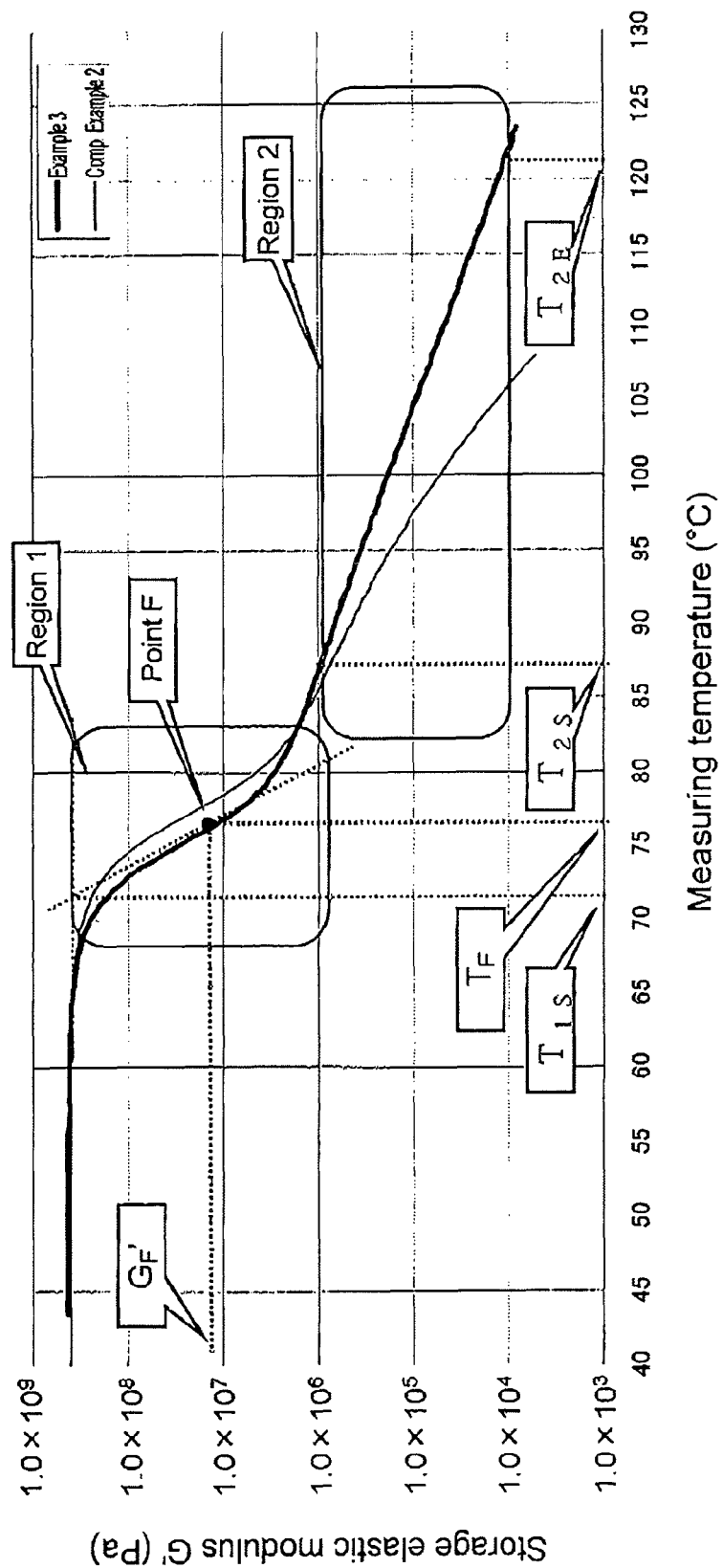

AMORPHOUS POLYESTER RESIN, BINDER RESIN FOR TONER FOR ELECTROSTATIC IMAGE DEVELOPMENT AND AMORPHOUS POLYESTER RESIN PRODUCTION METHOD

TECHNICAL FIELD

The present invention relates to an amorphous polyester resin, to a binder resin for toner for electrostatic image development, and to an amorphous polyester resin production method.

BACKGROUND ART

In recent years, with the development of OA appliances and the increasingly widespread use of computers, it is becoming common for ordinary households, personal offices and office units to carry out high-resolution color photograph printing or high-resolution commercial printing of posters, pamphlets and the like, which conventionally had been done in specialized printing works, and demand is increasing for higher-quality and higher-speed printing techniques.

The printing techniques that are employed include electrophotography, electrostatic recording and electrostatic printing methods, and in commonly employed methods, a photoconductive substance is used to form an electrostatic charge image on a photosensitive body by various means, the electrostatic charge image is then developed with toner, and the toner image is transferred to a print medium such as paper and heated and pressed with a roller to fix the image and obtain a print.

The binding resins used in conventional toner for electrostatic image development have been inexpensive styreneacrylic-based resins. However, even while demand increases for clearer images and higher gloss in high-resolution color photographic printing that is used in place of high resolution commercial printing as described above and silver-salt photography, the gloss has been insufficient with the conventional styrene-acrylic-based resins. The use of polyester resins, which have excellent gloss, is therefore increasing to meet the demand for greater gloss.

Incidentally, printers are used in a wide temperature range, from a condition in which the printer interior is at low temperature immediately after start-up and immediately before printing, to a condition in which the printer interior is at high temperature due to heat accumulation with continuous printing. Fusion of a toner to a print medium often fails to occur when the printer interior is at low temperature, while toner break-up tends to occur in a high-temperature state, and problems such as thin print spots, dropouts, uneven coloration, roller blotting, and the like, are caused.

In order to solve these problems, toners must have cold offset resistance to prevent failed fusion of the toner at low temperature, and hot offset resistance to prevent breakup of the toner at high temperature.

Examples of toners designed for both cold offset resistance and hot offset resistance include binding resins which are combinations of a crystalline polyester resin that has inferior hot offset resistance but exhibits satisfactory cold offset resistance, and an amorphous polyester resin that has inferior cold offset resistance but exhibits satisfactory hot offset resistance (Patent documents 1 to 3). In this case, however, the amorphous polyester resin and crystalline polyester resin become partially mixed, creating a problem in that it becomes impossible for satisfactory performance of each resin to be sufficiently exhibited, or a problem in that, even with satisfactory performance, it is difficult to achieve adequate supply due to the large amount of expensive crystalline resin starting material that must be used.

In some cases, a low-molecular-weight amorphous polyester resin with satisfactory cold offset resistance is used in combination with a high-molecular-weight amorphous polyester resin with satisfactory hot offset resistance (Patent document 4). However, the performance of each becomes equalized so that both are inadequate, while the binding resin tends to bleed out onto the toner surface, often resulting in poor toner storage stability.

In light of this background, there is a demand for development of a polyester resin as a binding resin that allows both cold offset resistance and hot offset resistance to be obtained.

Yet in order to obtain satisfactory cold offset resistance, for example, it is necessary to lower the glass transition point or melting temperature of the polyester resin, and this requires lowering of the average molecular weight of the resin. In order to obtain satisfactory hot offset resistance, on the other hand, it is necessary for the melt viscosity of the resin not to be lowered too much but to be suitably maintained without reduction even at high temperature, and for this reason it is necessary for the average molecular weight of the resin to be increased. Because of these contradictory requirements, such as for the average molecular weight of the resin, no polyester resin with satisfactory performance has yet been obtained despite attempts to achieve both hot offset resistance and cold offset resistance.

In addition, polyester resins pose problems in terms of their production. Generally, polyester resins are synthesized by direct polycondensation reaction between an aromatic dicarboxylic acid such as terephthalic acid or isophthalic acid, and a polyhydric alcohol. However, aromatic dicarboxylic acids have very high melting points and low solubility in different polyhydric alcohols, and therefore when direct polycondensation methods are applied, problems such as sublimation of the aromatic dicarboxylic acid and non-uniformity of the reaction system can occur, potentially resulting in inconveniences such as the following.

Sublimation of the aromatic dicarboxylic acid makes it impossible to achieve precise control of the molar ratio.

Adhesion and pooling of the sublimates on the production equipment lowers the efficiency of the heat exchanger.

The sublimates can introduce a hazard of dust explosion.

Because the reaction system is non-uniform, the monomer has differing reactivity and control of the higher-order structure of the resin is hampered.

The non-uniformity of the reaction system also interferes with high molecularization.

These problems occur whether the production system is a batch system or continuous system, and are unavoidable whenever an aromatic dicarboxylic acid such as terephthalic acid or isophthalic acid is used as the starting material.

CITATION LIST

Patent Literature

[Patent document 1] Japanese Unexamined Patent Application Publication No. 2001-222138

[Patent document 2] Japanese Unexamined Patent Application Publication HEI No. 11-249339

[Patent document 3] Japanese Unexamined Patent Application Publication No. 2004-191623

[Patent document 4] Japanese Unexamined Patent Application Publication HEI No. 5-17562

SUMMARY OF INVENTION

Technical Problem

It is an object of the present invention to provide an amorphous polyester resin that can satisfactorily achieve the reciprocal performance properties of hot offset resistance and cold offset resistance, which is a major issue for a toner for electrostatic image development, while allowing adequate blocking resistance to be obtained, as well as a binder resin for toner for electrostatic image development, and an amorphous polyester resin production method.

Solution to Problem

In light of these circumstances, the invention provides an amorphous polyester resin produced by reaction between a polybasic carboxylic acid compound and a polyhydric alcohol, wherein the polybasic carboxylic acid compound comprises (a) the reaction product between an aromatic polybasic carboxylic acid compound and a C2-4 glycol at 60 mol % or greater based on the total amount of the polybasic carboxylic acid compound, and the amorphous polyester resin has (I) a glass transition point of 55° C. to 75° C. and (II) a weight-average molecular weight of 10,000 to 50,000.

The amorphous polyester resin of the invention can satisfactorily achieve both hot offset resistance and cold offset resistance while allowing adequate blocking resistance to be obtained.

The polyhydric alcohol preferably comprises an alkylene oxide adduct of bisphenol A and/or an alkylene oxide adduct of bisphenol S.

If the polyhydric alcohol has such a constitution, it will be possible to further increase the hot offset resistance and blocking resistance.

The amorphous polyester resin preferably has a content of no greater than 5.0 wt % for components with a weight-average molecular weight of up to 500.

If the amorphous polyester resin has such a constitution, it will be possible to minimize bleed out onto the toner particle surface and further increase the blocking resistance.

The amorphous polyester resin also preferably has an acid value of 4-25 mgKOH/g.

If the amorphous polyester resin has such a constitution it will be possible to further increase the blocking resistance.

The invention also provides a binder resin for toner for electrostatic image development comprising the amorphous polyester resin described above.

The invention further provides a production method for the amorphous polyester resin described above, wherein reaction is conducted between the polyhydric alcohol and the polybasic carboxylic acid compound comprising (a) the reaction product between the aromatic polybasic carboxylic acid compound and the C2-4 glycol at 60 mol % or greater based on the total amount of the polybasic carboxylic acid compound, in a homogeneously dissolved state.

According to the amorphous polyester resin production method of the invention, it is possible to produce an amorphous polyester resin without sublimation of the starting materials and with uniformity of the reaction, so that the inconveniences of production encountered in the prior art are avoided.

Advantageous Effects of Invention

The amorphous polyester resin of the invention can satisfactorily exhibit the reciprocal performance properties of hot offset resistance and cold offset resistance, while allowing adequate blocking resistance to be obtained, and it is useful as a binding resin for a toner for electrostatic image development.

The amorphous polyester resin obtained by the production method of the invention is produced using the reaction product between an aromatic polybasic carboxylic acid compound and C2-4 glycol as a starting material, and since miscibility of the compound with other starting materials is satisfactory, the reaction can be conducted in a uniform system and the aforementioned problems of the prior art encountered during production can be solved.

BRIEF DESCRIPTION OF DRAWINGS

FIG. 1 is a graph plotting the common logarithm log G' of the storage elastic modulus G' against temperature T, upon measuring the dynamic viscoelasticities of the amorphous polyester resins obtained in Example 3 and Comparative Example 2.

DESCRIPTION OF EMBODIMENTS

According to the invention, an "amorphous" polyester resin is a polyester resin that does not exhibit a distinct crystal melting endothermic peak in its DSC (differential scanning calorimetry) curve, and specifically, it is one that has an enthalpy of fusion of no greater than 5 mJ/mg, as determined from the melting endotherm peak area. In contrast, a "crystalline" polyester resin is one that exhibits a distinct crystal melting endothermic peak and has an enthalpy of fusion of greater than 5 mJ/mg. The value of the enthalpy of fusion is determined using indium as the standard substance.

Generally speaking, a crystalline polyester resin exhibits a sharp melting temperature, and the storage elastic modulus in dynamic viscoelasticity measurement falls rapidly at temperatures below the melting temperature, and therefore its use alone as a binding resin in a toner for electrostatic image development is known to result in penetration into the print medium, causing fixing defects and image bleeding.

In contrast, an amorphous polyester resin exhibits no distinct melting temperature and has a rubbery region from above the glass transition point, and therefore tends to easily keep its storage elastic modulus until immediately before initial flow of the resin in dynamic viscoelasticity measurement.

The term "cold offset resistance", as used herein, refers to resistance to troubles caused mainly by the toner (for example, printing thin spots and dropouts, uneven color or fixing defects resulting from toner melting failures, melting spots and the like), during printing immediately after start-up of the printer and immediately after printing has commenced, in a state of low temperature, or in other words, a state in which the sections that are to be preheated before printing, such as the heating and fixing rollers, are not sufficiently warmed. The cold offset resistance is more satisfactory with a lower minimum fixing temperature of the toner.

The term "hot offset resistance" refers to resistance to troubles caused mainly by the toner (for example, printing thin spots and unevenness, bleeding, toner blotting or fusion of toner onto the rollers, that result from fixing defects when the toner itself breaks up between the print medium, the toner and the roller), during printing in a state of high temperature, or in other words, a state in which sections such as the transfer, heating and fixing rollers, are at high temperature due to heat accumulation inside the printer during continuous printing or high-speed printing. The hot offset resistance is more satisfactory with a higher maximum fixing temperature of the toner.

The term "blocking resistance" refers to the storage stability of the toner. When a toner cartridge is placed in a harsh environment, such as during transport or storage in the summer season, the toner particles tend to coalesce or aggregate together, and if this increases to a significant degree the toner will fail to flow even with vibration and be no longer used as a toner. Blocking resistance is the resistance to this type of trouble.

An amorphous polyester resin according to an embodiment of the invention will now be explained. The amorphous polyester resin of this embodiment has a glass transition point of 55° C. to 75° C. and a weight average molecular weight of 10,000 to 50,000. If the glass transition point is below 55° C. the blocking resistance will be insufficient, and if it increases above 75° C. the cold offset resistance may tend to be reduced. If the weight-average molecular weight is less than 10,000, the storage elastic modulus will not be maintained at high temperature and the hot offset resistance will be inadequate. If the weight-average molecular weight exceeds 50,000, the viscosity of the reaction system will be too high and the load on the production equipment such as the stirring devices will be increased, hampering production, while the melt viscosity of the resin will be too high, tending to lower the cold offset resistance and gloss. If the weight-average molecular weight of the amorphous polyester resin is increased within the aforementioned range, the glass transition point will increase within the range specified above.

The amorphous polyester resin of this embodiment preferably exhibits the specific behavior of having region 1 and region 2 satisfying the following conditions, when the common logarithm of the storage elastic modulus G' [Pa], obtained by dynamic viscoelasticity measurement, is plotted against temperature T [° C.].

FIG. 1 is a graph plotting the common logarithm log G' of the storage elastic modulus against temperature T, upon measuring the dynamic viscoelasticities of the amorphous polyester resins obtained in Example 3 and Comparative Example 2, described below. The flat section at the left of the graph represents a glassy region in which the amorphous polyester resin is glassy. In contrast, the flat section at the right represents the rubbery region in which it is rubbery. The section between the left and right flat sections is the transition region, i.e. the region of transition from the glassy region to the rubbery region. Region 1 corresponds to the transition region. The behavior of the storage elastic modulus G' in region 1 correlates primarily with the storage property (blocking resistance), fixing property and cold offset resistance of the toner.

In region 1, the initial decrease temperature $T_{1S}$ for log G' of the amorphous polyester resin is 55° C. to 72° C. The initial decrease temperature $T_{1S}$ of log G' is the temperature of intersection between a line extending from the baseline of log G' in the glassy region of the graph of FIG. 1 toward the high temperature end, and the tangent at point F, as the maximum of the rate of change of log G' with respect to T (absolute value of [d(log G')/dT]). In region 1, temperature $T_F$ at point F is 65° C. to 77° C., and the storage elastic modulus GF is $8.0 \times 10^6$ to $4.0 \times 10^7$ Pa. When $T_{1S}$ is lower than 55° C., $T_F$ is lower than 65° C. or $G_F'$ is smaller than $8.0 \times 10^6$ Pa, the toner may undergo coalescence or aggregation when exposed to high temperature for prolonged periods, tending to lower the blocking resistance and result in easier melting of the resin than when the values are within the ranges specified above, such that the toner may penetrate too deeply into the print medium to cause bleeding, thereby reducing image clarity. If $T_{1S}$ is higher than 72° C., $T_F$ is higher than 77° C. or $G_F'$ is larger than $4.0 \times 10^7$ Pa, the resin will be resistant to melting during printing at low temperature, thereby tending to cause uneven melting and lower the image fixing property, and reducing the cold offset resistance compared to when the values are within the ranges specified above.

Also in region 1, the mean value for the rate of change of log G' with respect to T (the absolute value of [d(log G')/dT]) is 0.25 to 0.30, for $T_F \pm 2°$ C. If the mean value of the rate of change of log G' with respect to T (the absolute value of [d(log G')/dT]) is smaller than 0.25 for $T_F \pm 2°$ C. in region 1, the resin will tend to undergo uneven melting during printing at low temperature, potentially resulting in a reduced image fixing property, while if it is greater than 0.30 the resin will tend to melt more easily, such that the toner will tend to penetrate too deeply into the print medium to produce bleeding, potentially lowering the image clarity. Stated differently, if the mean value is between 0.25 and 0.30, the resin will easily melt with low quantity of heat, and when used as a binding resin, the printing suitability at low temperature, i.e. the cold offset resistance, will tend to be satisfactory.

In the graph of FIG. 1, region 2 is in the rubbery region, and it is the region wherein the storage elastic modulus G' is between $1.0 \times 10^6$ Pa and $1.0 \times 10^4$ Pa. The behavior of the storage elastic modulus G' in region 2 correlates primarily with the hot offset resistance. That is, when the storage viscoelastic modulus G' in region 2 is moderately reduced in the appropriate temperature range, the hot offset resistance will tend to be satisfactory.

In region 2, the temperature $T_{2S}$ with a storage elastic modulus G' of $1.0 \times 10^6$ Pa is preferably 74° C. to 90° C. When $T_{2S}$ is lower than 74° C., the melt viscosity of the resin will tend to be lowered, resulting in easier penetration into the print medium, i.e. image bleeding, than when it is within the aforementioned range, and tending to reduce the image clarity, hot offset resistance and gloss, while if it is higher than 90° C., the resin will be resistant to melting, and the cold offset resistance will tend to be lower than when it is within the aforementioned range. In region 2, the difference between the temperatures $T_{2E}$ and $T_{2S}$ (temperature range) ($T_{2E} - T_{2S}$) with a storage elastic modulus of $1.0 \times 10^4$ Pa is 20° C. to 40° C. Also in region 2, the mean value for the rate of change of log G' with respect to T (absolute value of [d(log G')/dT]) is 0.05 to 0.09. If the mean value for the rate of change of log G' in region 2 is less than 0.05, and $T_{2E} - T_{2S}$ is more than 40° C., the resin will be more difficult to melt and fracturing will tend to occur when it is used as a binding resin, while if the mean value for the rate of change of log G' is greater than 0.09, and $T_{2E} - T_{2S}$ is less than 20° C., the resin will undergo excessive melting, penetration into the print medium during printing (image bleeding) will tend to take place at high temperature, and the hot offset resistance and gloss will tend to be lower than when it is within the range specified above.

That is, when $T_{2S}$ is 74° C. to 90° C., $T_{2S} - T_{2E}$ is 20° C. to 40° C. and the mean value of the rate of change of log G' in region 2 is 0.05 to 0.09, the hot offset resistance will be satisfactory and it will tend to be easier to achieve it at the same time as cold offset resistance.

The amorphous polyester resin of this embodiment is produced by reacting a polybasic carboxylic acid compound and a polyhydric alcohol, and particularly it comprises at least 60 mol % of (a) the reaction product between an aromatic polybasic carboxylic acid compound and a C2-4 glycol, with the polybasic carboxylic acid compound starting material. By having such a constitution, the amorphous polyester resin of this embodiment can exhibit an effect for the reciprocal performance properties of cold offset resistance and hot offset resistance.

The polybasic carboxylic acid compound to be used for production of an amorphous polyester resin comprehensively includes polybasic carboxylic acids, their acid anhydrides, their lower alkyl (preferably C 1-3) esters, and derivatives of the foregoing. Polybasic carboxylic acid compounds include (a) reaction products of aromatic polybasic carboxylic acid compounds and C2-4 glycols.

The aromatic polybasic carboxylic acid compound to be used for production of component (a) comprehensively includes polybasic carboxylic acids with aromatic rings, their acid anhydrides and their lower alkyl (preferably C1-3) esters, and specifically, aromatic dicarboxylic acids such as phthalic acid, terephthalic acid, isophthalic acid and naphthalenedicarboxylic acid, tribasic and greater aromatic carboxylic acids such as trimellitic acid and pyromellitic acid, anhydrides of these acids, and lower alkyl (preferably C1-3) esters of these acids. Aromatic polybasic carboxylic acid compounds are preferably aromatic dicarboxylic acid compounds, to facilitate control of the glass transition point or weight-average molecular weight of the amorphous polyester resin.

Examples of C2-4 glycols to be used for production of component (a) include alkylene glycols such as ethylene glycol, propylene glycol, 1,3-propanediol and butanediol, and glycols such as diethylene glycol. Of these, C2-3 alkylene glycols are preferred for more satisfactory reactivity during production of the polyester resin, i.e. for more satisfactory efficiency of the transesterification reaction.

The ratio of the aromatic polybasic carboxylic acid compound and C2-4 glycol to be used for production of component (a) is preferably 1.0:1.8 to 1.0:3.0 and more preferably 1.0:2.0 to 1.0:2.5, as the molar ratio. If the molar ratio of the C2-4 glycol is lower than 1.8 mol with respect to 1.0 mol of the aromatic polybasic carboxylic acid compound, the aromatic polybasic carboxylic acid compound will tend to remain in the system in an unreacted state, and when the reaction product is used for synthesis of a polyester resin, the problem of sublimation may not be avoided or the reaction may not take place as a uniform system. If the molar ratio of the C2-4 glycol is higher than 3.0 mol with respect to 1.0 mol of the aromatic polybasic carboxylic acid compound, unreacted glycol may remain, leading to a more prolonged reaction or increased cost. There are no particular restrictions on the method for producing component (a), and component (a) may be produced by esterification or transesterification with a reaction temperature of 120° C. to 260° C. (preferably 130° C. to 210° C.), and if necessary it may be produced by reaction under reduced pressure. An inert gas such as nitrogen may be appropriately bubbled through during the reaction, and a catalyst for esterification or transesterification may also be used.

Component (a) is preferably the reaction product between an aromatic dicarboxylic acid compound and a C2-3 alkylene glycol, and such a reaction product will have a structure represented by the following general formula [1].

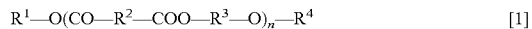

$$R^1\text{—O(CO—}R^2\text{—COO—}R^3\text{—O)}_n\text{—}R^4 \qquad [1]$$

(In general formula [1], $R^1$ represents a C2-3 alkyleneglycol residue, hydrogen or a lower alkyl group (preferably C1-3), $R^2$ represents an aromatic dicarboxylic acid residue, $R^3$ represents a C2-3 alkylene group and $R^4$ represents hydrogen or a monoester group with the aromatic dicarboxylic acid compound. The letter n represents the number of the repeating units, and it is an integer of about 1 to 12.)

The component (a) is detected as several peaks in gel permeation chromatography (GPC), and is analyzed as being a mixture in which n is about 1 to 12 in general formula [1].

The average molecular weight of component (a) is preferably 300 to 1500 and more preferably 330 to 800. If the average molecular weight is less than 300, unreacted aromatic polybasic carboxylic acid compound may remain in component (a), and sublimation may not be adequately minimized, while if the average molecular weight exceeds 1500, miscibility with the polyhydric alcohol will be reduced, synthesis of the polyester resin may not take place as a uniform system, and the reaction may potentially be inhibited.

The amount of component (a) used for production of an amorphous polyester is at least 60 mol %, and it may be 100 mol %, preferably 70-98 mol % and more preferably 80-95 mol %, of the total number of moles of the polybasic carboxylic acid compound. If the amount of component (a) used is less than 60 mol %, the glass transition point of the obtained resin will tend to be 55° C. or lower, resulting in insufficient hot offset resistance or blocking resistance.

Examples of polybasic carboxylic acid compounds other than component (a) that may be used include tribasic and greater carboxylic acids, including tribasic and greater aromatic carboxylic acids such as trimellitic acid and pyromellitic acid, and tribasic and greater alicyclic carboxylic acids such as 1,2,4-cyclohexanetricarboxylic acid, 1,3,5-cyclohexanetricarboxylic acid, 1,2,4,5-cyclohexanetetracarboxylic acid and 1,2,3,4,5,6-cyclohexanehexacarboxylic acid, as well as their acid anhydrides and lower (preferably C1-3) alkyl esters. According to the invention, for even higher molecularization of the amorphous polyester resin and satisfactory hot offset resistance, it is more preferred to use a tribasic or greater carboxylic acid compound at 2-30 mol % in the polybasic carboxylic acid compound and it is especially preferred to use of a tribasic or greater aromatic carboxylic acid compound.

As other polybasic carboxylic acid compounds there may be used, in ranges that do not interfere with the effect of the invention, straight-chain or branched aliphatic polybasic carboxylic acids such as oxalic acid, malonic acid, succinic acid, maleic acid, glutaric acid, adipic acid, pimelic acid, suberic acid, azelaic acid, sebacic acid, dodecanedioic acid, 2-ethylhexylsuccinic acid, oleylsuccinic acid, 2-dodecenylsuccinic acid and tetrapropenylsuccinic acid, alicyclic dicarboxylic acids including 1,2-cyclohexanedicarboxylic acid, 1,3-cyclohexanedicarboxylic acid, 3-methyl-1,2-cyclohexanedicarboxylic acid, 4-methyl-1,2-cyclohexanedicarboxylic acid, 3-ethyl-1,2-cyclohexanedicarboxylic acid, 3-propyl-1,2-cyclohexanedicarboxylic acid, 3-butyl-1,2-cyclohexanedicarboxylic acid, and cyclohexenedicarboxylic acids such as 3-cyclohexene-1,2-dicarboxylic acid, dimer acids obtained by dimerization of fatty acids with unsaturated bonds such as oleic acid or tall oil fatty acids, as well as anhydrides and lower alkyl (C1-3) esters of the aforementioned acids, but because they can potentially lower the glass transition point of the amorphous polyester resin, they are preferably used at less than 30 mol % with respect to the total polybasic carboxylic acid compound.

Polyhydric alcohols to be used for production of an amorphous polyester resin are preferably divalent aromatic alcohols, divalent alicyclic alcohols or their alkylene oxide adducts, and more preferably alkylene oxide adducts of divalent aromatic alcohols, from the viewpoint of more easily adjusting the glass transition point to the range specified above. Divalent aromatic alcohols include bisphenol A, bisphenol S, catechol, resorcinol, hydroquinone, and the like. Divalent alicyclic alcohols include hydrogenated bisphenol A, hydrogenated bisphenol S, cyclohexanedimethanol, spiroglycol, dioxaneglycol, and the like. A polyhydric alcohol is more preferably an alkylene oxide adduct of bisphenol A. The alkylene oxide adduct of bisphenol A is preferably present in the polyhydric alcohol at 50 mol % or greater, and more preferably 60 mol % or greater. Its content may even be 100 mol %.

In an alkylene oxide adduct of bisphenol A, the alkylene oxide is preferably a C2-4 alkylene oxide, the number of moles of addition is preferably 2-5 mol and more preferably 2-4.5 mol, and the form of addition may be simple addition of a single alkylene oxide or addition of 2 or more different alkylene oxides. If the number of moles of addition is less than 2 mol, phenolic hydroxyl groups will tend to remain, potentially inhibiting reaction with the polybasic carboxylic acid compound, while if it exceeds 5 mol, the glass transition point may be lowered, tending to lower the hot offset resistance or blocking resistance, compared to when the number is within the range specified above.

From the viewpoint of adjusting the glass transition point of the amorphous polyester resin or facilitating a uniform reaction system in the amorphous polyester resin production method described below, it is preferred to use a propylene oxide adduct of bisphenol A. From the viewpoint of facilitating control of the glass transition point of the amorphous polyester resin, it is preferred to use an ethylene oxide adduct of bisphenol A. From the viewpoint of facilitating uniformity of the reaction system and control of the glass transition point, it is particularly preferred to use an ethylene oxide adduct and a propylene oxide adduct of bisphenol A in combination. The ethylene oxide adduct and propylene oxide adduct of bisphenol A are preferably used in a molar ratio (ethylene oxide adduct):(propylene oxide adduct) of 0:100 to 50:50, more preferably a molar ratio of 10:90 to 50:50 and most preferably a molar ratio of 20:80 to 40:60.

The polyhydric alcohol may further comprise an alkylene oxide adduct of bisphenol S, in order to further improve the hot offset resistance or blocking resistance. The alkylene oxide adduct of bisphenol S is preferably present in the polyhydric alcohol at 2-40 mol % and more preferably 5-30 mol %. The preferred ranges for the number of carbons and number of moles of addition of the alkylene oxide are the same as for bisphenol A.

Other polyhydric alcohols that may be used in combination include, for example, dihydric aliphatic alcohols such as ethylene glycol, propylene glycol, 1,3-propanediol, butanediol, pentanediol, hexanediol, heptanediol, nonanediol, decanediol and neopentyl glycol; and trihydric and greater alcohols such as glycerin, trimethylolpropane and pentaerythritol, in amounts that do not interfere with the effect of the invention.

The (polybasic carboxylic acid compound):(polyhydric alcohol) ratio for production of the amorphous polyester resin is preferably 50:100 to 120:100 and more preferably 50:100 to 98:100, as the molar ratio. By reacting the polybasic carboxylic acid compound and polyhydric alcohol with a molar ratio in the range specified above, it will be easier to control the weight-average molecular weight of the amorphous polyester resin to the aforementioned range. When the amount of polybasic carboxylic acid compound used is less than 50 mol with respect to 100 mol of the polyhydric alcohol, the weight-average molecular weight of the obtained amorphous polyester resin may not reach 10,000, which is the lower limit, and if the amount of polybasic carboxylic acid compound used is greater than 98 mol with respect to 100 mol of the polyhydric alcohol, the weight-average molecular weight of the obtained amorphous polyester resin may exceed 50,000, which is the upper limit.

The amorphous polyester resin preferably has a content of no greater than 5.0 wt % for components with a weight-average molecular weight of up to 500. A large content of components with a weight-average molecular weight of up to 500 (polyester oligomers) will result in more bleed out of those components into the toner particle surface, tending to prevent sufficient improvement in the blocking resistance. Such components can be reduced by controlling the production conditions for the amorphous polyester resin, such as increasing the reaction temperature, reducing the pressure, or lengthening the reaction time.

The amorphous polyester resin has an acid value of preferably 4-25 mgKOH/g and more preferably 5-15 mgKOH/g. If the acid value is less than 4 mgKOH/g, ion repulsion between the particles will be reduced due to the electrical charge of the toner surface, and problems such as toner coalescence or aggregation will more easily occur when it is exposed to high temperature conditions for prolonged periods, such as during storage, while the blocking resistance will tend to be lower than when the value is within the specified range. If the acid value is greater than 25 mgKOH/g, on the other hand, the hygroscopicity due to ionic functional groups will be increased and the blocking resistance may potentially be lower than when the value is within the aforementioned range, while the electrostatic properties of the toner may be reduced, potentially leading to lower image quality caused by poor image formation. If the acid value is within the range of 4 to 25 mgKOH/g, it will be easy to control the particle size, in the case of chemical toner prepared by emulsification and reaggregation of the resin.

When the acid value of the produced amorphous polyester resin falls outside of the specified range, the polybasic carboxylic acid may be appropriately reacted to adjust the value within the range.

The amorphous polyester resin preferably has a dielectric loss tangent tan δ of between 0.0015 and 0.0060 at an applied frequency of 1 kHz, under conditions of 25° C. temperature, 65% RH. If the dielectric loss tangent tan δ value is within this range, it will be possible to impart suitable electrostatic properties to toner when the resin is used as a binding resin for toner, and there will tend to be fewer problems such as lack of image formation due to charge deficiency or melting of the resin or blotting of the photosensitive roller due to charge excess.

The amorphous polyester resin preferably has a temperature of 90° C. to 125° C. when the melt viscosity is 10,000 Pa·s. If the amorphous polyester resin satisfies these conditions, the cold offset resistance and hot offset resistance will be more satisfactory. More specifically, when the temperature is below 90° C., the viscosity of the binding resin falls during fixing at high temperature, image bleeding occurs more readily due to excessive penetration into the print medium, and the hot offset resistance tends to be lower than when the temperature is within the aforementioned range. On the other hand, when the temperature is above 125° C., the viscosity of the binding resin becomes too high during fixing at low temperature, fixing defects occur more readily, and the cold offset resistance tends to be lower than when the temperature is within the aforementioned range.

The amorphous polyester resin production method of the invention will now be described. The amorphous polyester resin can be obtained by mixing a polybasic carboxylic acid compound comprising at least 60 mol % of component (a)

with a polyhydric alcohol, and reacting them with the obtained mixture in a uniformly dissolved state.

Component (a) has satisfactory miscibility with the other amorphous polyester resin starting materials (i.e. the other polybasic carboxylic acid compounds or polyhydric alcohols), and the mixture is in a uniformly dissolved state at around 140° C. The production conditions for the amorphous polyester resin may be, for example, about 3-7 hours at 180° C. to 280° C. (preferably 200° C. to 270° C.) under reduced pressure, and therefore production can be accomplished with the mixture in a sufficiently uniformly dissolved state. Since the amorphous polyester resin is thus produced with the mixture in a uniformly dissolved state, it is possible to eliminate the inconveniences of the prior art that result from reaction in a non-uniform system.

A catalyst known in the prior art may be used for production of the amorphous polyester resin, for example, a transesterification catalyst such as antimony trioxide, an organic tin-based polymerization catalyst such as dibutyltin oxide, a germanium-based catalyst, an inorganic titanium-based catalyst, an organic titanium-based catalyst such as n-tetrabutoxytitanium or tetraisopropoxytitanium, an organic cobalt-based catalyst, zinc acetate, manganese acetate, or the like, with germanium-based catalysts, inorganic titanium-based catalysts and organic titanium-based catalysts being preferred for use.

An antioxidant may also be added to the amorphous polyester resin at any desired stage during the production process, or after production, for the purpose of preventing coloration or thermal decomposition. Such antioxidants are not particularly restricted, and examples include hindered phenol-based antioxidants, phosphite-based antioxidants and sulfur-containing antioxidants.

The amorphous polyester resin produced in this manner may be used directly, or in combination with an amorphous or crystalline polyester resin known in the prior art, as a binding resin for a toner for electrostatic image development.

Crystalline polyester resins that may be used in combination with amorphous polyester resins include resins produced by combining at least one type of dicarboxylic acid selected from among C4-12 (preferably C8-12) aliphatic dicarboxylic acids, and at least one type of diol selected from among C2-12 (preferably C8-12) aliphatic diols. Such crystalline polyester resins preferably have melting temperatures of 65° C. to 75° C. as measured by DSC (JIS K7121(1987), 9.1(3)).

When the amorphous polyester resin of the invention is to be used as a binding resin for production of toner, a chemical toner obtained by a method known in the prior art such as a kneading/pulverizing method, a spray drying method or an emulsified dispersion method may be employed, or the components used for production of the toner may be components known in the prior art.

EXAMPLES

The invention will now be described in greater detail by examples, with the understanding that the invention is not limited thereto.

The evaluations in the examples were carried out by the following methods.

(1) Hydroxyl Value

The hydroxyl value of component (a) was measured by the pyridine-acetyl chloride method of JIS K 0070(1992), 7.3.

(2) Acid Value

The acid value of the amorphous polyester resin was measured by applying correspondingly to the neutralization titration method of JIS K 0070(1992), 3.1, using a mixed solvent of tetrahydrofuran:water=10:1 (volume ratio) as the measuring solvent, and dissolving 1 g of sample in 60 mL of the mixed solvent.

(3) Melting Point

The melting point of component (a) was defined as the temperature at the apex of the melting endotherm peak in a graph with quantity of heat plotted against temperature, obtained using a DSC-6220 differential scanning calorimeter (product of SIT NanoTechnology Inc.).

<Measuring Conditions>

Temperature-elevating and temperature-lowering rate: 10° C./min

Temperature-elevating program: Temperature increase from room temperature to 150° C., followed by holding at 150° C. for 1 minute.

Measurement was then conducted with temperature decrease to 0° C., holding at 0° C. for 1 minute and further temperature increase to 150° C.

Atmosphere: Nitrogen stream (50 mL/min)
Cell: Sealed aluminum
Sample weight: 5 mg (4) Weight-Average Molecular Weight The weight-average molecular weight of the amorphous polyester resin was measured by the following method. Specifically, 2 mg of polyester resin was added to and dissolved in 5 mL of tetrahydrofuran, and the weight-average molecular weight was determined in terms of polystyrene, using an HLC-8220GPC gel permeation chromatograph (GPC) (product of Tosoh Corp.). The proportion of components of weight-average molecular weight up to 500 was also calculated by the area ratio of the detected peaks.

<Measuring Conditions>

Detector: RI detector
Mobile phase: Tetrahydrofuran
Column: Two Tsk-gel Super HZ 2000 columns and one Tsk-gel Super HZ 4000 column, connected in series.
Sample injector and column temperature: 40° C.
RI detector temperature: 35° C.
Sample injection rate: 5 μL
Flow rate: 0.25 mL/min
Measuring time: 40 minutes (5) Glass Transition Point The glass transition point of the amorphous polyester resin was measured by DSC, according to JIS K7121(1987), 9,3 (3), A DSC-6220 differential scanning calorimeter (product of SII NanoTechnology Inc.) was used as the measuring apparatus, and the measuring conditions were the same as for (3) Melting point, (6) Measurement of Storage Elastic Modulus An ARES Rheometer dynamic viscoelasticity measuring apparatus (product of Rheometrix) was used for measurement of the storage elastic modulus G' of the amorphous polyester resin. The sample was anchored between parallel plates, reciprocally-oscillated twist strain was applied at an oscillation frequency of 6.28 rad/sec from one side, and the stress on the other side against this strain was detected. The temperature was gradually increased from room temperature in this state, and the temperature dependence of viscoelasticity was measured. The measuring conditions were as follows.

<Measuring Conditions>

Oscillation frequency: 6.28 rad/sec
Measuring temperature: 40° C. to 130° C.
Parallel plates: φ8 mm
Measuring CAP: 2.5 mm
Strain: 30%
Temperature-elevating rate: 1° C./min (7) Temperature for Melt Viscosity of 10,000 Pa·s Using a CFT-500 elevated flow tester (product of Shimadzu Corp.), 1.0 g of amorphous polyester resin was placed in a cylinder equipped with a die (length: 1.0 mm, diameter: (φ0.5 mm) and held at 85° C. for 5 minutes, after which a load of 25 kg was applied with a plunger while raising the temperature by 3° C./min and measuring the melt viscosity, and the temperature at which the melt viscosity was 10,000 Pa·s was recorded.

(8) Dielectric Loss Tangent (tan δ)

The amorphous polyester resin was placed and pressurized in a die to prepare pellets (diameter: φ55 mm, thickness: 2 mm), and the dielectric loss tangent (tan δ) with an applied frequency of 1.0 kHz was measured under conditions with a temperature of 25° C., a humidity of 60% RH, a voltage of 5 V and off bias, using an LCR 3522-50 HighTester (product of Hioki E.E. Corp.), (9) Evaluation During Amorphous Polyester Resin Production (9-1) Uniformity of Reaction System The starting materials were charged into a reactor and heated to 180° C. while stirring under nitrogen aeration, the transmittance of the mixture for visible light at 660 nm was measured with a spectrophotometer, and the uniformity was evaluated on the following scale.

A: Transmittance of 90% or greater, uniform and transparent.

B: Transmittance of at least 75% and less than 90%, some insolubles present but essentially uniform and transparent.

C: Transmittance of less than 75%, non-uniform with abundant insolubles discernible.

(9-2) Sublimation Inhibition

The degree of inhibition of problems due to sublimation from aromatic dicarboxylic acid compounds was evaluated on the following scale.

<Sublimation Inhibition I (Reactor)>

The degree of adhesion of sublimates from aromatic dicarboxylic acid compounds onto the reactor after addition of catalyst was visually confirmed.

A: No adhesion of sublimates, no sublimation observed.
B: Slight adhesion of sublimates.
C: Adhesion of sublimates.
D: Considerable adhesion of sublimates.

<Sublimation Inhibition II (Distillation Tube)>

The degree of accumulation of sublimates inside the glass distillation tube connecting the vacuum pump and reactor during reduced pressure reaction was evaluated.

A: No accumulation of sublimates, target pressure reduction achieved in reactor.

B: Accumulation of sublimates, occasional failure to achieve target pressure reduction in reactor. However, recovery was achieved by forced nitrogen aeration.

C: Accumulation of sublimates, occasional failure to achieve target pressure reduction in reactor, requiring switching of distillation tubes (i.e., switching to an auxiliary distillation tube or cleaning the distillation tube) up to 2 times.

D: Accumulation of sublimates, occasional failure to achieve target pressure reduction in reactor, requiring switching of distillation tubes (i.e., switching to an auxiliary distillation tube or cleaning the distillation tube), 3 or more times.

(Production of Component (a))

Production Example 1

After charging 970 g of dimethyl terephthalate, 682 g of ethylene glycol and 0.04 g of zinc acetate, as a catalyst, into a predried reactor, the mixture was heated under nitrogen aeration while stirring to uniform dissolution. The mixture was then heated to 150° C. and transesterification reaction was conducted at 150° C. for 3 hours, after which it was heated to 210° C. to distill off the unreacted ethylene glycol and obtained reaction product (a-1).

The melting point of reaction product (a-1) was 70.1° C., as determined by DSC, and the hydroxyl value was 297 mgKOH/g. The average molecular weight was calculated to be 378 from the hydroxyl value, by the following formula.

Average molecular weight=56100/(hydroxyl value)×2

Production Examples 2 and 3

Reaction products (a-2) and (a-3) were obtained in the same manner as Production Example 1, except for changing the starting materials and composition (molar ratio) as shown in Table 1. The melting points, hydroxyl values and average molecular weights of the obtained reaction products are shown in Table 1.

TABLE 1

|  | Production Example 1 Reaction product (a-1) | Production Example 2 Reaction product (a-2) | Production Example 3 Reaction product (a-3) |
|---|---|---|---|
| Starting composition (molar ratio) |  |  |  |
| Dimethyl terephthalate | 100 | 100 | — |
| Dibutyl isophthalate | — | — | 100 |
| Ethylene glycol | 220 | — | 220 |
| Propylene glycol | — | 220 | — |
| Melting point by DSC (° C.) | 70.1 | 25.9 | 40.9 |
| Hydroxyl value of reaction product (mgKOH/g) | 297 | 267 | 317 |
| Average molecular weight | 378 | 420 | 354 |

(Production of Amorphous Polyester Resin)

Example 1

In a reactor that had been sufficiently dried beforehand there were charged 456 g of a 2.2 molar ethylene oxide adduct of bisphenol A, 923 g of a 2.3 molar propylene oxide adduct of bisphenol A, 1058 g of reaction product (a-1) obtained in Production Example 1, 56 g of tetrapropenyl succinic anhydride and 23 g of trimellitic anhydride, and the mixture was heated to 180° C. while stirring under nitrogen aeration. The mixture during this time was in a uniformly dissolved state. As a catalyst there was charged 0.7 g of n-tetrabutoxytitanium, the mixture was heated to 240° C., and pressure reduction was effected to a final reactor internal pressure of below 2 kPa, for polycondensation reaction at 240° C. for 5 hours.

The reactor interior was then restored to ordinary pressure with nitrogen, 23 g of trimellitic anhydride was further added under nitrogen aeration for adjustment of the acid value, and reaction was conducted at 210° C. for 1 hour to obtain an amorphous polyester resin (A-1).

Examples 2 to 12 and Comparative Examples 1 to 5

Amorphous polyester resins (A-2) to (A-12) and (B-1) to (B-5) were obtained in the same manner as Example 1, except that the starting materials and composition (molar ratio) were changed as shown in Tables 2 to 4.

The resin compositions and physical properties of the amorphous polyester resins obtained in the examples and comparative examples are summarized in Tables 2 to 4. The amorphous polyester resin (B-5) of Comparative Example 5 had an excessively low glass transition point, and therefore the dynamic viscoelasticity could not be accurately measured. In Tables 2 to 4, EO and PO represent ethylene oxide and propylene oxide, respectively.

TABLE 2

|  | Example 1 A-1 | Example 2 A-2 | Example 3 A-3 | Example 4 A-4 | Example 5 A-5 | Example 6 A-6 |
| --- | --- | --- | --- | --- | --- | --- |
| Bisphenol A PO 2.3 molar adduct | 65 | 65 | 65 | 65 | 60 | 65 |
| Bisphenol A EO 2.2 molar adduct | 35 | 35 | 35 | 35 | 40 | 35 |
| Bisphenol S EO 2.0 molar adduct | — | — | — | — | — | — |
| Reaction product (a-1) | 70 | 70 | 70 | 62 | 60 | — |
| Reaction product (a-2) | — | — | — | — | — | 70 |
| Reaction product (a-3) | — | — | — | — | — | — |
| Tetrapropenyl succinic anhydride | 5 | 5 | 5 | 9 | 7 | 5 |
| Succinic anhydride | — | — | — | — | 5 | — |
| Trimellitic anhydride | 3 | 4 | 5 | 6 | 4 | 3 |
| n-Tetrabutoxytitanium | 0.05 | 0.05 | 0.05 | 0.05 | 0.05 | 0.05 |
| Trimellitic anhydride (acid value-adjusted) | 3 | 3 | 3 | 4 | 3 | 4 |
| Proportion in polybasic carboxylic acid compound (mol %) |  |  |  |  |  |  |
| Component (a) | 86.4 | 85.4 | 84.3 | 76.5 | 75.9 | 85.4 |
| Tribasic or greater carboxylic acid compound | 7.4 | 8.5 | 9.6 | 12.3 | 8.9 | 8.5 |
| Glass transition temp. (° C.) | 61.5 | 64.0 | 71.6 | 60.7 | 60.4 | 63.6 |
| Weight-average mol. wt. | 16,100 | 18,800 | 29,800 | 44,500 | 18,100 | 19,500 |
| Content of components with weight-average mol. wt. ≤500 (wt %) | 2.5 | 2.4 | 2.1 | 3.1 | 3.1 | 3.0 |
| Acid value (mgKOH/g) | 7.0 | 7.0 | 7.6 | 12.3 | 6.2 | 6.2 |
| Dielectric loss tangent (tan δ) | 0.0034 | 0.0036 | 0.0042 | 0.0038 | 0.0033 | 0.0038 |
| Temp. at 10,000 Pa melt viscosity (° C.) | 104.2 | 107.3 | 111.1 | 108.3 | 100.9 | 103.8 |
| Region 1 |  |  |  |  |  |  |
| $T_{1S}$ (° C.) | 66.2 | 67.6 | 70.6 | 70.0 | 66.5 | 67.6 |
| $T_P$ (° C.) | 70.6 | 73.1 | 76.1 | 74.6 | 70.1 | 73.1 |
| $G_F^1$ ($10^7$ Pa) | 2.1 | 1.3 | 1.5 | 2.0 | 1.1 | 1.1 |
| Mean change in $\log G^1$ | 0.26 | 0.26 | 0.25 | 0.26 | 0.26 | 0.26 |
| Region 2 |  |  |  |  |  |  |
| $T_{2S}$ (° C.) | 79.6 | 81.6 | 86.6 | 84.6 | 81.6 | 81.1 |
| $T_{2E}$ (° C.) | 105.4 | 109.1 | 121.6 | 118.6 | 109.1 | 108.1 |
| Temperature range ($T_{2E}-T_{2S}$) (° C.) | 25.9 | 27.5 | 35.0 | 34.0 | 27.5 | 27.0 |
| Mean change in $\log G^1$ | 0.08 | 0.07 | 0.06 | 0.06 | 0.07 | 0.07 |
| Evaluation during production |  |  |  |  |  |  |
| Reaction uniformity | A | A | A | A | A | A |
| Sublimation inhibition I | A | A | A | A | A | A |
| Sublimation inhibition II | A | A | A | A | A | A |
| Distillation tube switching count | 0 | 0 | 0 | 0 | 0 | 0 |

TABLE 3

|  | Example 7 A-7 | Example 8 A-8 | Example 9 A-9 | Example 10 A-10 | Example 11 A-11 | Example 12 A-12 |
| --- | --- | --- | --- | --- | --- | --- |
| Bisphenol A PO2.3 molar adduct | 65 | 65 | 65 | 65 | 65 | 65 |
| Bisphenol A EO2.2 molar adduct | 35 | 15 | 35 | 35 | 35 | — |
| Bisphenol S EO2.0 molar adduct | — | 20 | — | — | — | — |
| Cyclohexanedimethanol | — | — | — | — | — | 35 |
| Reaction product (a-1) | — | 52 | 71 | 72 | 85 | 70 |
| Reaction product (a-2) | — | — | — | — | — | — |
| Reaction product (a-3) | 70 | — | — | — | — | — |
| Tetrapropenyl succinic anhydride | 5 | 4 | 5 | 5 | 7 | 5 |
| Succinic anhydride | — | 10 | — | — | — | — |
| Trimellitic anhydride | 3 | 3 | 2 | 1 | 3 | 3.5 |
| n-Tetrabutoxytitanium | 0.05 | 0.05 | 0.05 | 0.05 | 0.05 | 0.05 |
| Trimellitic anhydride (acid value-adjusted) | 4 | 3 | 3 | 3 | 2 | 2.5 |
| Proportion in polybasic carboxylic acid compound (mol %) |  |  |  |  |  |  |
| Component (a) | 85.4 | 72.2 | 87.7 | 88.9 | 87.6 | 86.4 |
| Tribasic or greater carboxylic acid compound | 8.5 | 8.3 | 6.2 | 4.9 | 5.2 | 7.4 |
| Glass transition temp. (° C.) | 61.6 | 65.6 | 59.1 | 56.4 | 68.0 | 67.6 |
| Weight-average mol. wt. | 18,500 | 19,500 | 12,200 | 10,400 | 35,300 | 28,900 |
| Content of components with weight-average mol. wt. ≤500 (wt %) | 2.4 | 3.1 | 3.0 | 3.4 | 1.7 | 2.1 |
| Acid value (mgKOH/g) | 7.0 | 6.0 | 5.4 | 6.0 | 5.9 | 8.2 |

TABLE 3-continued

|  | Example 7 A-7 | Example 8 A-8 | Example 9 A-9 | Example 10 A-10 | Example 11 A-11 | Example 12 A-12 |
|---|---|---|---|---|---|---|
| Dielectric loss tangent (tan δ) | 0.0034 | 0.0038 | 0.0041 | 0.0045 | 0.0040 | 0.0055 |
| Temp. at 10,000 Pa melt viscosity (° C.) | 100.2 | 108.4 | 97.7 | 97.3 | 110.2 | 121.2 |
| Region 1 | | | | | | |
| $T_{1S}$ (° C.) | 65.9 | 65.6 | 63.0 | 63.3 | 69.5 | 71.5 |
| $T_F$ (° C.) | 72.1 | 70.5 | 68.6 | 68.1 | 75.3 | 76.0 |
| $G_F{}^1$ ($10^7$ Pa) | 1.2 | 2.1 | 1.2 | 1.7 | 1.5 | 2.5 |
| Mean change in $\log G^1$ | 0.26 | 0.26 | 0.26 | 0.26 | 0.26 | 0.29 |
| Region 2 | | | | | | |
| $T_{2S}$ (° C.) | 79.1 | 80.6 | 75.6 | 75.6 | 85.4 | 87.4 |
| $T_{2E}$ (° C.) | 106.7 | 103.1 | 97.1 | 99.1 | 122.1 | 122.4 |
| Temperature range ($T_{2E}-T_{2S}$) (° C.) | 27.7 | 22.5 | 21.5 | 23.5 | 36.7 | 35.0 |
| Mean change in $\log G^1$ | 0.07 | 0.09 | 0.09 | 0.08 | 0.06 | 0.06 |
| Evaluation during production | | | | | | |
| Reaction uniformity | A | A | A | A | A | A |
| Sublimation inhibition I | A | A | A | A | A | A |
| Sublimation inhibition II | A | A | A | A | A | A |
| Distillation tube switching count | 0 | 0 | 0 | 0 | 0 | 0 |

TABLE 4

|  | Comp. Ex. 1 B-1 | Comp. Ex. 2 B-2 | Comp. Ex. 3 B-3 | Comp. Ex. 4 B-4 | Comp. Ex. 5 B-5 |
|---|---|---|---|---|---|
| Bisphenol A PO2.3 molar adduct | 65 | 70 | 70 | 65 | 50 |
| Bisphenol A EO2.2 molar adduct | 35 | 30 | 30 | 35 | 50 |
| Terephthalic acid | — | 110 | — | — | — |
| Isophthalic acid | — | — | 110 | — | — |
| Dimethyl terephthalate | — | — | — | 85 | — |
| Reaction product (a-1) | 46 | — | — | — | 40 |
| Tetrapropenyl succinic anhydride | — | — | — | 5 | 10 |
| Succinic anhydride | — | — | — | — | 35 |
| Trimellitic anhydride | — | — | — | 10 | 5 |
| n-Tetrabutoxytitanium | 0.05 | — | — | 0.05 | 0.05 |
| Trimellitic anhydride (acid value-adjusted) | 2 | — | — | — | 4 |
| Proportion in polybasic carboxylic acid compound (mol %) | | | | | |
| Component (a) | 95.8 | 0 | 0 | 0 | 42.6 |
| Tribasic or greater carboxylic acid compound | 4.2 | 0 | 0 | 10.0 | 9.6 |
| Glass transition temp. (° C.) | 56.4 | 68.9 | 66.9 | 67.7 | 49.4 |
| Weight-average mol. wt. | 8,600 | 9,700 | 10,200 | 29,200 | 12,600 |
| Content of components with weight-average mol. wt. ≤500 (wt %) | 3.9 | 1.2 | 1.1 | 2.7 | 8.6 |
| Acid value (mgKOH/g) | 6.0 | 26.0 | 28.0 | 12.1 | 17.2 |
| Dielectric loss tangent (tan δ) | 0.0057 | 0.0076 | 0.0082 | 0.0053 | 0.0039 |
| Temp. at 10,000 Pa melt viscosity (° C.) | 92.8 | 109.4 | 107.6 | 111.4 | — |
| Region 1 | | | | | |
| $T_{1S}$ (° C.) | 61.1 | 72.7 | 72.3 | 71.8 | — |
| $T_P$ (° C.) | 66.1 | 78.1 | 77.6 | 76.8 | — |
| $G_F'$ ($10^7$ Pa) | 1.8 | 1.3 | 1.3 | 1.5 | — |
| Mean change in $\log G'$ | 0.26 | 0.24 | 0.22 | 0.23 | — |
| Region 2 | | | | | |
| $T_{2S}$ (° C.) | 73.6 | 85.6 | 85.1 | 83.4 | — |
| $T_{2E}$ (° C.) | 92.6 | 106.1 | 107.1 | 112.7 | — |
| Temperature range ($T_{2E} - T_{2S}$) (° C.) | 19 | 20.5 | 22 | 29.3 | — |
| Mean change in $\log G'$ | 0.11 | 0.1 | 0.09 | 0.07 | — |
| Evaluation during production | | | | | |
| Reaction uniformity | A | C | C | A | C |
| Sublimation Inhibition I | A | D | D | D | A |
| Sublimation inhibition II | A | C | C | D | A |
| Distillation tube switching count | 0 | 2 | 1 | 5 | 0 |

(Preparation of Toner)

Examples 13 to 24 and Comparative Examples 6 to 10

Toners were prepared using amorphous polyester resins (A-1) to (A-12) and (B-1) to (B-5) obtained in Examples 1 to 12 and Comparative Examples 1 to 5, as binding resins. The toners were each prepared with different coloring agents (total of 4: carbon black, C.I. Pigment Blue 15:3, C.I. Pigment Yellow 12 and C.I. Pigment Red 48:1).

After mixing 100 parts by weight of an amorphous polyester resin as listed in Tables 5 to 7, 4 parts by weight of the charge control agent "T-77" (product of Hodogaya Chemical Co., Ltd.), 3 parts by weight of Paraffin Wax HNP-9 (product of Nippon Seiro Co., Ltd.) and 7 parts by weight of a coloring agent in a 20 L-volume Henschel mixer at 1500 rpm for 60 seconds, 7 parts by weight of a coloring agent was further added and the components were mixed for 10 seconds. The obtained mixture was melt kneaded with a twin-screw extruder and cooled, and then subjected to coarse grinding to about 1 mm with a hammer mill. The coarse ground product was then subjected to fine milling with an air jet-type pulverizer and classified with a sieve, to obtain negatively charged toner particles with a volume-average particle size (d50) of 6.0 μm.

(Evaluation of Toner Performance)

The evaluation was conducted with an IPSIO C-4500IT full color copier (product of Ricoh Co., Ltd.), modified for temperature adjustment. Each prepared toner was packaged into a toner cartridge, and a halftone image with an image density of 0.8 to 0.85 was printed onto 90 g/m² A4 plain paper and evaluated. The temperature was measured with a thin-film thermometer situated between the fixing roller and the sheet.

Each prepared 4-color toner was evaluated based on the following properties: cold offset resistance, hot offset resistance, low-temperature fixing property, image stability and blocking resistance.

<Cold Offset Resistance>

The condition of image blotting of the fixing roller and print was visually confirmed during printing at a printing speed of 50 sheets/min, and judged on the following scale.
A: No blotting even at below 130° C.
B: No blotting from 140° C.
C: No blotting from 150° C.
D: Blotting even at above 160° C.

<Hot Offset Resistance>

The condition of image blotting of the fixing roller and print was visually confirmed during printing at a printing speed of 50 sheets/min, and judged on the following scale.
A: No blotting even at above 230° C.
B: Slight blotting at 230° C., but no blotting at 220° C.
C: Slight blotting at 220° C., but no blotting at 210° C.
D: Blotting even at 210° C.

<Low-Temperature Fixing Property>

The minimum fixing temperature onto paper was measured during printing at a printing speed of 50 sheets/min, and judged on the following scale. For the fixing property, the fixing temperature was defined as the temperature at which the reduction in density was no greater than 15% as the average at 5 points, after 5 reciprocal rubbing passes on the printed image with lens-cleaning paper under a 4.9 kPa load.
A: Fixing possible at below 130° C.
B: Fixing possible at 140° C.
C: Fixing possible at 150° C.
D: Fixing not possible without a temperature of 160° C. or higher.

<Image Stability>

A temperature-variable full color copier was used for a printing test of 100,000 sheets at a printing speed of 50 sheets/min, and the change in density of the printed image was visually examined and evaluated on the following scale.
A: No visually discernible change in image density.
B: Slight change in image density, but no problem for practical use.
C: Moderate change in image density, constituting problem for practical use.
D: Considerable change in image density, rendering image indiscernible.

<Blocking Resistance>

After placing 5 g of toner in a 50 mL glass sample bottle, it was allowed to stand for 24 hours in a dryer at a temperature of 50° C. and then cooled at room temperature for 24 hours. This was defined as 1 cycle, and 2 such cycles were repeated. The state of aggregation of the toner after 2 cycles was visually examined and evaluated on the following scale.
A: Toner easily flowed when sample bottle was inverted.
B: Toner flowed when sample bottle was inverted and tapped 2-3 times (no solidification).
C: Toner flowed when sample bottle was inverted and tapped 5-6 times (some solidification).
C: Toner failed to flow even when sample bottle was inverted and tapped.

<Overall Evaluation>

For the above evaluations, points were assigned for the judgments of A to D obtained for the 4-color toners, based on the following scale.
A: 5 points
B: 3 points
C: 1 point
D: 0 points The total value of the points assigned in evaluation of the 4-color toners for each evaluation was calculated, and re-evaluated on the following scale as the overall evaluation of the amorphous polyester resin. The evaluation results are summarized in Tables 5 to 7.
A: Total of 16-20 points
B: Total of 11-15 points
C: Total of 6-10 points
D: Total of 0-5 points

TABLE 5

|  |  | Example 13 | Example 14 | Example 15 | Example 16 | Example 17 | Example 18 |
|---|---|---|---|---|---|---|---|
| Composition (parts by wt.) | A-1 | 100 | — | — | — | — | — |
|  | A-2 | — | 100 | — | — | — | — |
|  | A-3 | — | — | 100 | — | — | — |
|  | A-4 | — | — | — | 100 | — | — |
|  | A-5 | — | — | — | — | 100 | — |
|  | A-6 | — | — | — | — | — | 100 |

TABLE 5-continued

|  |  | Example 13 | Example 14 | Example 15 | Example 16 | Example 17 | Example 18 |
|---|---|---|---|---|---|---|---|
|  | Charge control agent | 4 | 4 | 4 | 4 | 4 | 4 |
|  | Paraffin wax HNP-9 | 3 | 3 | 3 | 3 | 3 | 3 |
|  | Coloring agent | 14 | 14 | 14 | 14 | 14 | 14 |
| Evaluation | Cold offset resistance | A | A | A | A | A | A |
|  | Hot offset resistance | B | A | A | A | B | B |
|  | Low-temperature fixing property | A | A | A | A | A | A |
|  | Image stability | A | A | A | A | A | A |
|  | Blocking resistance | A | A | A | A | B | A |

TABLE 6

|  |  | Example 19 | Example 20 | Example 21 | Example 22 | Example 23 | Example 24 |
|---|---|---|---|---|---|---|---|
| Composition (parts by wt.) | A-7 | 100 | — | — | — | — | — |
|  | A-8 | — | — | 100 | — | — | — |
|  | A-9 | — | — | — | 100 | — | — |
|  | A-10 | — | — | — | — | 100 | — |
|  | A-11 | — | 100 | — | — | — | — |
|  | A-12 | — | — | — | — | — | 100 |
|  | Charge control agent | 4 | 4 | 4 | 4 | 4 | 4 |
|  | Paraffin wax HNP-9 | 3 | 3 | 3 | 3 | 3 | 3 |
|  | Coloring agent | 14 | 14 | 14 | 14 | 14 | 14 |
| Evaluation | Cold offset resistance | A | A | A | A | A | B |
|  | Hot offset resistance | B | A | B | B | B | A |
|  | Low-temperature fixing property | A | B | A | A | A | B |
|  | Image stability | B | A | A | B | B | A |
|  | Blocking resistance | B | A | B | B | B | A |

TABLE 7

|  |  | Comp. Ex. 6 | Comp. Ex. 7 | Comp. Ex. 8 | Comp. Ex. 9 | Comp. Ex. 10 |
|---|---|---|---|---|---|---|
| Composition (parts by wt.) | B-1 | 100 | — | — | — | — |
|  | B-2 | — | 100 | — | — | — |
|  | B-3 | — | — | 100 | — | — |
|  | B-4 | — | — | — | 100 | — |
|  | B-5 | — | — | — | — | 100 |
|  | Charge control agent | 4 | 4 | 4 | 4 | 4 |
|  | Paraffin wax HNP-9 | 3 | 3 | 3 | 3 | 3 |
|  | Coloring agent | 14 | 14 | 14 | 14 | 14 |
| Evaluation | Cold offset resistance | A | C | C | B | C |
|  | Hot offset resistance | C | B | B | A | D |
|  | Low-temperature fixing property | D | B | C | B | D |
|  | Image stability | C | B | B | B | C |
|  | Blocking resistance | D | C | C | C | D |

The amorphous polyester resins (A-1) to (A-12) of Examples 1 to 24 exhibited specific storage elastic modulus G' behavior, as shown in Tables 2 to 4, and when used as binding resins for toner, they have both of the reciprocal performance properties of cold offset resistance and hot offset resistance, as shown in Tables 5 to 7, while also exhibiting excellent image fixing properties and blocking resistance.

The production proceeds with the reaction system in a uniformly dissolved state, and as shown in Tables 2 to 4, without generation of sublimates from the aromatic dicarboxylic acid compounds and without troubles such as clogging of the distillation tube, thus allowing stable production to be accomplished.

Moreover, whereas the glass transition point is usually lowered in most cases where an aliphatic carboxylic acid compound such as succinic acid is used as a polybasic carboxylic acid compound, in the amorphous polyester resins of Examples 1 to 22, an alkylene oxide adduct of bisphenol A is used as the polyhydric alcohol, and also in combination with an alkylene oxide adduct of bisphenol S, thus allowing the glass transition point to be maintained while improving the hot offset resistance.

On the other hand, with amorphous polyester resin (B-1) which has a low weight-average molecular weight, even when component (a) has been used, the conditions for the starting temperature $T_{2S}$ of region 2, the temperature range $(T_{2E}-T_{2S})$ and the mean value for the rate of change of log G' in region 2 are not satisfied, and hot offset resistance and blocking resistance cannot be obtained.

Even if component (a) is used but in a low amount, as in resin (B-5), the glass transition point is lowered and the resin is not suitable as a binding resin for a toner.

The conventional amorphous polyester resins (B-2) and (B-3) produced without using component (a) were not able to exhibit both hot offset resistance and cold offset resistance, and blocking performance was also not obtained.

With amorphous polyester resin (B-4), the toner performance was satisfactory, including cold offset resistance, hot offset resistance, low-temperature fixing property and image stability, but serious sublimation problems occurred during production, making stable production difficult to accomplish, while the aromatic polybasic carboxylic acid compound (dimethyl terephthalate) remaining as an unreacted substance also bled out into the toner surface as time progressed, and the blocking resistance was poor.

INDUSTRIAL APPLICABILITY

When a prescribed amount of (a) the reaction product between an aromatic polybasic carboxylic acid and a C2-4 glycol is used as the polybasic carboxylic acid compound according to the invention, it is possible to obtain a polyester resin exhibiting specific behavior for the storage elastic modulus G'. The resin exhibits the reciprocal performance properties of cold offset resistance and hot offset resistance, and is useful as a binding resin for toner for electrostatic image development.

Furthermore, by using the aforementioned reaction product it is possible to improve the problems associated with polyester resin production (for example, difficulty in controlling the reaction molar ratio due to sublimation of the aromatic dicarboxylic acid compound, difficulty in maintaining control of the reaction, adhesion of sublimates onto production equipment, and reduced production efficiency due to accumulation of sublimates).

The invention claimed is:

1. An amorphous polyester resin produced by reaction between a polybasic carboxylic acid compound and a polyhydric alcohol, wherein:
   the polybasic carboxylic acid compound comprises (a) the reaction product between an aromatic polybasic carboxylic acid compound and a C2-4 glycol at 60 mol % or greater based on the total amount of the polybasic carboxylic acid compound, and
   the amorphous polyester resin has:
   (I) a glass transition point of 55° C. to 75° C. and
   (II) a weight-average molecular weight of 10,000 to 50,000.

2. The amorphous polyester resin according to claim 1, wherein the polyhydric alcohol comprises an alkylene oxide adduct of bisphenol A and/or an alkylene oxide adduct of bisphenol S.

3. The amorphous polyester resin according to claim 1, which has a content of no greater than 5.0 wt % for components with a weight-average molecular weight of no greater than 500.

4. The amorphous polyester resin according to claim 1, wherein the acid value is 4 to 25 mgKOH/g.

5. A binder resin for toner for electrostatic image development, comprising the amorphous polyester resin according to claim 1.

6. A production method for the amorphous polyester resin according to claim 1, wherein reaction is conducted between the polyhydric alcohol and the polybasic carboxylic acid compound comprising (a) the reaction product between the aromatic polybasic carboxylic acid compound and the C2-4 glycol at 60 mol % or greater based on the total amount of the polybasic carboxylic acid compound, in a homogeneously dissolved state.

7. The amorphous polyester resin according to claim 2, which has a content of no greater than 5.0 wt % for components with a weight-average molecular weight of no greater than 500.

8. The amorphous polyester resin according to claim 2, wherein the acid value is 4 to 25 mgKOH/g.

9. The amorphous polyester resin according to claim 3, wherein the acid value is 4 to 25 mgKOH/g.

10. A binder resin for toner for electrostatic image development, comprising the amorphous polyester resin according to claim 2.

11. A binder resin for toner for electrostatic image development, comprising the amorphous polyester resin according to claim 3.

12. A binder resin for toner for electrostatic image development, comprising the amorphous polyester resin according to claim 4.

13. A production method for the amorphous polyester resin according to claim 2, wherein reaction is conducted between the polyhydric alcohol and the polybasic carboxylic acid compound comprising (a) the reaction product between the aromatic polybasic carboxylic acid compound and the C2-4 glycol at 60 mol % or greater based on the total amount of the polybasic carboxylic acid compound, in a homogeneously dissolved state.

14. A production method for the amorphous polyester resin according to claim 3, wherein reaction is conducted between the polyhydric alcohol and the polybasic carboxylic; acid compound comprising (a) the reaction product between the aromatic polybasic carboxylic acid compound and the C2-4 glycol at 60 mol % or greater based on the total amount of the polybasic carboxylic acid compound, in a homogeneously dissolved state.

15. A production method for the amorphous polyester resin according to claim 4, wherein reaction is conducted between the polyhydric alcohol and the polybasic carboxylic acid compound comprising (a) the reaction product between the aromatic polybasic carboxylic acid compound and the C2-4 glycol at 60 mol or greater based on the total amount of the polybasic carboxylic acid compound, in a homogeneously dissolved state.

* * * * *